(12) United States Patent
Liu

(10) Patent No.: US 11,350,646 B2
(45) Date of Patent: Jun. 7, 2022

(54) CHEWING GUMS WITH CROSS-LINKED HYDROCOLLOIDS AND COUPLING AGENTS

(71) Applicant: WM. WRIGLEY JR. COMPANY, Chicago, IL (US)

(72) Inventor: Jingping Liu, Chicago, IL (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 32 days.

(21) Appl. No.: 15/764,579

(22) PCT Filed: Sep. 30, 2016

(86) PCT No.: PCT/US2016/054707
§ 371 (c)(1),
(2) Date: Mar. 29, 2018

(87) PCT Pub. No.: WO2017/059216
PCT Pub. Date: Apr. 6, 2017

(65) Prior Publication Data
US 2018/0235252 A1   Aug. 23, 2018

Related U.S. Application Data

(60) Provisional application No. 62/235,354, filed on Sep. 30, 2015.

(51) Int. Cl.
*A23G 4/08* (2006.01)
*A23G 4/06* (2006.01)

(52) U.S. Cl.
CPC ............... *A23G 4/08* (2013.01); *A23G 4/06* (2013.01); *A23V 2002/00* (2013.01)

(58) Field of Classification Search
CPC .................... A23G 4/08; A23G 4/06
See application file for complete search history.

(56) References Cited

U.S. PATENT DOCUMENTS

| | | | |
|---|---|---|---|
| 3,930,026 A | 12/1975 | Clark | |
| 4,551,490 A * | 11/1985 | Doyle | A61L 15/585 428/355 BL |
| 5,006,401 A * | 4/1991 | Frank | A61F 13/0273 128/898 |
| 5,059,189 A * | 10/1991 | Cilento | A61K 9/7053 156/66 |
| 6,270,794 B1 * | 8/2001 | Cilento | A61L 15/24 424/443 |
| 6,451,883 B1 * | 9/2002 | Chen | A61F 5/443 524/31 |
| 6,872,410 B2 | 3/2005 | Soldani | |
| 2004/0247742 A1 | 12/2004 | Bridger | |
| 2006/0083818 A1 | 4/2006 | Bridger | |
| 2006/0153949 A1 | 7/2006 | Gebreselassie | |
| 2008/0057155 A1 * | 3/2008 | Luo | A23G 4/08 426/5 |
| 2009/0022846 A1 * | 1/2009 | Wittorff | A23G 4/06 426/5 |
| 2010/0104688 A1 | 4/2010 | Andersen | |
| 2011/0111084 A1 | 5/2011 | Neergaard | |
| 2012/0045494 A1 * | 2/2012 | Harris | A23G 4/08 424/401 |
| 2013/0316042 A1 * | 11/2013 | Guan | A23G 4/06 426/3 |
| 2014/0056836 A1 | 2/2014 | Subramaniam | |

FOREIGN PATENT DOCUMENTS

| | | |
|---|---|---|
| JP | 2002068948 A | 3/2002 |
| WO | WO0154512 A1 | 8/2001 |
| WO | WO0167883 A1 | 9/2001 |
| WO | 200776856 A1 | 7/2007 |
| WO | WO2010125342 A3 | 12/2010 |
| WO | 2012099849 A1 | 7/2012 |
| WO | 2014031213 A1 | 2/2014 |

OTHER PUBLICATIONS

"Butyl Rubber." 2016. Encyclopedia Britannica. Downloaded Oct. 15, 2020 from https://www.britannica.com/science/butyl-rubber.*

* cited by examiner

*Primary Examiner* — Nikki H. Dees

(57) ABSTRACT

Compositions of chewing gum base that can include hydrocolloids and coupling agents are provided. Methods of making gum bases and chewing gum formulations are also provided.

10 Claims, No Drawings

CHEWING GUMS WITH CROSS-LINKED HYDROCOLLOIDS AND COUPLING AGENTS

CROSS-REFERENCE TO RELATED APPLICATION

This application claims priority to U.S. Provisional Application Ser. No. 62/235,354, filed on Sep. 30, 2015, which is incorporated in its entirety herein.

FIELD

The presently disclosed subject matter relates to chewing gum base compositions with improved removability from surface substrates. The gum bases disclosed herein contain hydrocolloids and coupling agents.

BACKGROUND

Conventional chewing gum bases with good chewing texture at body temperature usually exhibit good adhesion on various substrates at ambient temperature. As a result, gum-littering is a problem in both the gum industry and society generally. Therefore, there is a need to improve conventional gum bases to increase gum cud removability from undesired surfaces and substrates.

Commercial chewing gum is known to contains soluble and insoluble portions. The insoluble portion contains mainly gum bases and hydrophobic components, for example, masticatory polymers, tackifiers, plasticizers, lipids, fillers, emulsifiers and other additives. As such, it is difficult for hydrophilic flavors to release from the hydrophobic base in a sustained way during chewing.

There is an ongoing need to improve gum base formulations to improve gum removability while at the same time obtain desirable flavor release profiles. The presently disclosed subject matter addresses these needs as discussed in detail below.

SUMMARY OF THE INVENTION

The presently disclosed subject matter is directed to a chewing gum base comprising one or more hydrocolloids and one or more coupling agents.

In certain embodiments, the one or more hydrocolloids are selected from the group consisting of croscarmellose sodium, sodium starch glycolate, crospovidone, acrylic acid-based polymers cross-linked with polyalkenyl polyethers, starch-sodium polyacrylate graft copolymer, and sodium polyacrylate.

In certain embodiments, the one or more hydrocolloids are selected from the group consisting of diacetyl tartaric acid esters of monoglycerides (DATEM), citric acid esters of monoglycerides, succinylated monoglyceride, hydroxy-terminated butadiene, hydroxystearic acid-polyethylene glycol copolymer, acrylic acid-long chain alkyl acrylate copolymer, styrene-isoprene-styrene, styrene-butadiene-styrene, ethylene-propylene-ethylene, and ethylene-vinyl acetate-ethylene block copolymers.

In certain embodiments, the chewing gum base contains from about 1% to about 60% hydrocolloids by weight. In certain embodiments, the chewing gum base contains from about 1% to about 35% hydrocolloids by weight. In certain embodiments, the chewing gum base contains from about 1% to about 15% coupling agents by weight.

In certain embodiments, the chewing gum base comprises one or more components selected from the group consisting of elastomers, vinyl polymers, elastomer plasticizers, fillers, softeners, waxes, and combinations thereof.

Further, the presently disclosed subject matter is directed a chewing gum formulation comprising the chewing gum base of the presently disclosed subject matter.

The foregoing has outlined broadly the features and technical advantages of the present application in order that the detailed description that follows can be better understood. Additional features and advantages of the application will be described hereinafter which form the subject of the claims of the application. It should be appreciated by those skilled in the art that the conception and specific embodiment disclosed can be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of the application, both as to its organization and method of operation, together with further objects and advantages will be better understood from the following description.

DETAILED DESCRIPTION

As noted above, to date, there remains a need in the art for chewing gum bases with increased removability and desirable flavor release profiles. The presently disclosed subject matter addresses this need through gum base compositions containing hydrocolloids and coupling agents.

1. Definitions

The terms used in this specification generally have their ordinary meanings in the art, within the context of this disclosed subject matter and in the specific context where each term is used. Certain terms are discussed below, or elsewhere in the specification, to provide additional guidance to the practitioner in describing the compositions and methods of the disclosed subject matter and how to make and use them.

As used herein, the use of the word "a" or "an" when used in conjunction with the term "comprising" in the claims and/or the specification can mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value.

As used herein, the term "chewing gum" refers to a flavored substance intended for chewing. The term as used herein also includes bubble gum and confectionery products containing chewing gum. In certain embodiments, chewing gum forms include, but are not limited to, tablets, sticks, solid balls, hollow balls, cut and wrap, and pellets or pillows.

Unless otherwise specified, all percentages used herein are weight percents. As used herein, chewing gum contains a water insoluble base portion and a water-soluble bulk portion.

As used herein, the term "gum cud" refers to the remaining portion of a chewing gum formulation after mastication.

As used herein, the term "hydrocolloid" refers one or more polymers that form gels or viscous dispersions when dispersed in water.

As used herein, the term "coupling agent" can be used interchangeably with "surfactant" and refers to a compound that is utilized to increase the adhesion between incompatible components, e.g., a polymer and filler.

As used herein, the term "cold flow" refers to the viscous flow of a gum base composition or chewing gum formulation at ordinary, e.g., ambient, temperatures.

2. Gum Base Compositions

The presently disclosed subject matter relates to compositions of chewing gum, and more specifically to chewing gum bases, which can include hydrocolloids and coupling agents. As provided herein, the addition of hydrocolloids and coupling agents can improve the removability of chewing gum and/or chewing gum cud from various surfaces.

In general, a chewing gum composition comprises (i) a water-soluble bulk portion, (ii) water insoluble flavoring agents, and (iii) a water insoluble chewable gum base portion. The water-soluble bulk portion dissipates with a portion of the water insoluble flavoring agents over a period of time during chewing. However, the water insoluble gum base portion is retained in the mouth throughout the chew, forming what is known as gum cud. The produced gum cud is an adhesive substance that is difficult to remove once attached to dry surfaces or substrates (e.g., sidewalks and the like).

Intrinsically, gum cuds are complex, amorphous polymer blends. Unique viscoelastic properties make gum cuds behave like cold flow at ambient environment. Water is unavoidably introduced into the gum cud during chew by saliva. The free-movable water molecules can behave like plasticizers and increase the mobility of the cold flow while other polar molecules in the saliva increase the surface energy of the cuds. The adhesion of gum cud on various surfaces or substrates can be a result of the physical interlock of the gum cud molecules inside the pores of a porous substrate and/or the surface tensions at the interface of the gum and surface or substrate.

2.1 Hydrocolloids and Coupling Agents

The presently disclosed subject matter specifically provides for gum base compositions containing hydrocolloids and coupling agents to improve removability from surfaces.

Hydrocolloids

In certain embodiments of the subject matter disclosed herein, the hydrocolloids are cross-linked hydrocolloids. In specific embodiments, cross-linked hydrocolloids include, but are not limited to, croscarmellose sodium, sodium starch glycolate, crospovidone, acrylic acid-based polymers cross-linked with polyalkenyl polyethers, starch-sodium polyacrylate graft copolymer, sodium polyacrylate, and combinations thereof. In certain embodiments, the amount of cross-linked hydrocolloids in a gum base is in the range of from about 1% to about 60% w/w, from about 1% to about 35% w/w, from about 1% to about 20% w/w, from about 1% to about 10% w/w. In alternative embodiments, the amount of cross-linked hydrocolloids in a gum base can range from about 10% to about 60% w/w, from about 10% about 50% w/w, from about 10% to about 30% w/w, or from about 10% to about 25% w/w. In specific non-limiting embodiments, the amount of cross-linked hydrocolloids in the gum base is about 60% w/w, about 47.7% w/w, about 19.7% w/w, about 19.6% w/w, or about 4.4% w/w.

In the presently disclosed subject matter, the cross-linked hydrocolloids can convert water from a mobile liquid to a "de-moldable" solid or gel. This conversion can decrease the ability of small polar molecules, such as water, to act as plasticizers for the hydrophobic polymers. Super absorptive polymers swell remarkably well and can amount to several hundred times the weight of the polymer itself. The changes in volume of cross-linked hydrocolloid particles set up the stress in their vicinity. Depending on the elasticity of the matrix, the stresses either are accommodated locally by changes in molecular conformation (such as pushing back the cold flow) or cause disintegration (cut off the cold flow). In both cases, the dramatic volume change of cross-linked hydrocolloid particles decreases the adhesion between cuds and the substrate. Similarly, after water evaporation, the high shrinkage of the cross-linked hydrocolloid particles can increase the stress, debonding the gum cuds and the substrates, and thereby increase removability of the gum cud.

In specific embodiments of the disclosed subject matter, the cross-linked hydrocolloids are highly hydrophilic. In certain embodiments, the cross-linked hydrocolloids act as absorbents for hydrophilic ingredients. This can increase the overall polarity of the chewing gum base and increase the holding ability of hydrophilic flavor molecules.

Coupling Agents

Because conventional chewing gum bases are mainly composed of hydrophobic ingredients, the highly hydrophilic hydrocolloids are naturally immiscible with the hydrophobic elastomer matrixes. The presently disclosed subject matter discloses that coupling agents can be included to increase the compatibility of the cross-linked hydrocolloids with conventional gum bases. Such coupling agents include, but are not limited to, surfactants, polymeric surfactants, thermoplastic block copolymers, elastomers, and combinations thereof. In certain embodiments, coupling agents can be present in amounts ranging from about 0% to about 20% w/w, or from 0.5% to about 20% w/w, from about 1% to about 15% w/w, or from about 1% to about 10% w/w.

In certain embodiments, the surfactants include, but are not limited to, diacetyl tartaric acid esters of monoglycerides (DATEM), citric acid esters of monoglycerides and succinylated monoglyceride. In certain embodiments, the surfactant is present in the composition in an amount of from about 0.1% to about 15% w/w, from about 0.5% to about 10% w/w, or from about 0.5% to about 3% w/w. In specific non-limiting embodiments, the surfactant is present in the composition in an amount of about 3.6% w/w, about 6.94% w/w, or about 1.26% w/w.

In certain embodiments, polymeric surfactants can be incorporated into the gum base compositions as the coupling agents to increase the compatibility of the cross-linked hydrocolloids with conventional gum bases. In certain embodiments, the polymeric surfactants include, but are not limited to, hydroxy-terminated butadiene, hydroxystearic acid-polyethylene glycol copolymer, acrylic acid-long chain alkyl acrylate copolymer. In certain embodiments, the polymeric surfactant is present in the composition in an amount of from about 1% to about 20%, or from about 1% to about 18% w/w, or from about 3% to about 10% w/w. In specific non-lmiiting embodiments, the polymeric surfactant is present in the composition in an amount of about 15.9% w/w, about 4.4% w/w, or about 7% w/w.

In other embodiments, thermoplastic block copolymers can be used as the physical coupling agents to lock the cross-linked hydrocolloid particles in the chewing gum bases. In certain embodiments, the composition can include thermoplastic block copolymers, surfactants and polymeric surfactants alone or in combination. In certain embodiments, block copolymers include, but are not limited to, styrene-isoprene-styrene, styrene-butadiene-styrene, ethylene-propylene-ethylene, ethylene-vinyl acetate-ethylene block copolymers. In certain embodiments, the block copolymer is present in the composition in an amount of from about 0% to about 20% w/w, or from about 1 to about 10% w/w. In a specific non-limiting embodiment, the block copolymer is present in the composition in an amount of about 4.4% w/w.

In certain embodiments, the coupling agent can be diacetyl tartaric acid esters of monoglycerides. In other embodiments, the coupling agent is citric acid esters of monoglycerides. In other embodiments, the coupling agent is succinylated monoglyceride. In other embodiments, the coupling agent is hydroxystearic acid-polyethylene glycol copolymer. In other embodiments, the coupling agent is hydroxy-terminated 1,3-butadiene.

2.2. Additional Ingredients in Gum Base

An insoluble gum base typically contains any combination of elastomers (natural and/or synthetic), polymers, elastomer solvents (or elastomer plasticizers), fillers, softeners, waxes, lipids, and other optional ingredients such as colorants and antioxidants. The variety of gum base ingredients can provide the ability to modify the chewing characteristics of gums made from the gum base.

Elastomers provide the rubbery, cohesive nature to the gum, which varies depending on this ingredient's chemical structure and how it can be compounded with other ingredients. Natural elastomers can include natural rubber such as smoked or liquid latex and guayule, natural gums such as jelutong, lechi caspi perillo, massaranduba balata, massaranduba chocolate, nispero, rosidinha, chicle, gutta percha, gutta kataiu, niger gutta, tenu, chilte, chiquibul, gutta hang kang. In certain embodiments, the gum base composition can include from about 0% to about 30% w/w, or from about 0% to about 5% w/w natural elastomers.

Synthetic elastomers can include high molecular weight elastomers such as butadiene-styrene copolymers and isobutylene-isoprene copolymers. Synthetic elastomers can include, but are not limited to, polyisoprene, polysiobutylene, polyvinyl acetate, styrene butadiene rubber, vinyl acetate-vinyl laurate copolymer, poly-dl-lactide, glycolic acid-lactide copolymer or mixtures thereof. In certain embodiments, the gum base composition can include from about 3% to about 75% w/w, or from about 5% to about 75% w/w synthetic elastomers. In certain embodiments, the gum base composition can include from about 25% to about 60% w/w synthetic elastomers. In other embodiments, the gum base composition can include from about 3% to about 25% by weight synthetic elastomers. In specific non-limiting embodiments, the gum base composition can include about 4.9%, about 10%, about 12.7%, about 20.2%, about 22.3%, or about 23.9% w/w synthetic elastomers.

Polymers, which sometimes serve as elastomers, can include polybutadiene, vinyl polymers such as polyvinyl acetate, polyethylene, vinyl copolymeric elastomers such as vinyl acetate/vinyl laurate, vinyl acetate/vinyl stearate, ethylene/vinyl acetate, polyvinyl alcohol or mixtures thereof. These polymers perform best when used in combination with butadiene-styrene copolymers and isobutylene-isoprene copolymers.

Vinyl polymeric and copolymeric type elastomers provide tack resistance, vary the chew characteristics of gums made from these bases, and offer hydrophilic properties beneficial to sensory perception of the final gums. For copolymeric types, the amount of vinyl laurate, vinyl stearate, or ethylene present in the vinyl laurate/vinyl acetate (VLNA), vinyl stearate/vinyl acetate (VSNA), or ethylene/vinyl acetate (EVA) copolymers respectively typically can range from about 10% to about 60% w/w of the copolymer. Ball and ring softening points of these polymers can range from about to 50° C. to 120° C. Average molecular weights of these polymers can range from about 2,000 to about 80,000. In certain embodiments, molecular weights of these polymers, such as polyvinyl acetate, can have an average molecular weight of from about 8,000 to about 52,000 for use in the gum base and gum of the presently disclosed subject matter. In certain embodiments, molecular weights of these polymers can range from about 10,000 to about 35,000. Alternatively, for bubble gum bases, polymers can have molecular weights ranging from about 30,000 to about 60,000. Vinyl polymers typically release flavor quickly, and using iso-alkanic waxes exhibiting small crystalline structure with these vinyl polymers extends flavor release.

Elastomer solvents (sometimes called elastomer plasticizers) vary the firmness of the gum base. Their specificity on elastomer inter-molecular chain breaking (plasticizing) along with their varying softening points cause varying degrees of finished gum firmness when used in base. This is also important when one wishes to provide more elastomeric chain exposure to the alkanic chains of the waxes. Elastomer solvents include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, partially hydrogenated methyl esters of rosin, pentaerythritol ester of rosin, synthetic elastomer plasticizers such as terpene resins derived from alpha-pinene, beta-pinene and/or d-limonene, and mixtures thereof. The elastomer solvents used can be of one type or of combinations of more than one. Typically, the ratios of one to the other are dependent on each respective softening point, on each effect on flavor release, and on each respective degree of tack they cause to the gum.

Ball and ring softening points of the rosin ester types described above can range from about 60° C. to about 120° C. Softening points of the terpene resins can range from about 60° C. to about 130° C., and an average molecular weight of from about 500 to 2,000. Occasionally, both terpene and rosin ester resins can be used together. In certain embodiments, the gum base composition can include from about 5% to about 25% w/w of a combination of terpene and rosin esters. In other embodiments, the gum base composition can include from about 10% to about 20% w/w of a combination of terpene and rosin esters. In certain embodiments, the gum base composition can include from about 15.4% w/w terpene. In certain embodiments, the gum base composition can include from about 16.5% w/w terpene. In certain embodiments, the gum base composition can include from about 20.8% w/w terpene.

Fillers used in gum base modify the texture of the gum base and aid in processing. Fillers include carbonate or precipitated carbonated types such as magnesium and calcium carbonate, ground limestone and silicate types such as magnesium and aluminum silicate, clay, alumina, talc, as well as titanium oxide, mono- di- and tricalcium phosphate, cellulose polymers such as ethyl, methyl and wood or mixtures thereof. In certain embodiments, the gum base composition can include from about 0% to about 40% w/w filler, or from about 0% to about 15% w/w filler.

Softeners modify the texture, cause the hydrophobic and hydrophilic components of the base to be miscible, and can further plasticize the synthetic elastomers of the gum base. Softeners include fully hydrogenated oils of cottonseed, soybean, palm, palm kernel, coconut, safflower and the like, as well as monoglycerides, diglycerides, acetylated monoglycerides, distilled mono- and digiycerides and de-oiled or "powdered" lecithin. The glycerides and lecithin are sometimes referred to as emulsifiers. In certain embodiments, the gum base compositions includes from about 5% to about 55% w/w, or from about 15% to about 45% w/w softeners, including tackifiers, lipids and plasticizers.

Petroleum waxes aid in the curing of the finished gum made from the gum base as well as improve shelf-life and texture. Wax crystal size when hard also improves the release of flavor. Those waxes high in iso-alkanes have a smaller crystal size than those waxes high in normal-alkanes, especially those with normal-alkanes of carbon numbers less than 30. The smaller crystal size allows slower release of flavor since there is more hindrance of the flavor's escape from this wax versus a wax having larger crystal sizes.

Synthetic waxes are produced by means atypical of petroleum wax production. The synthetic waxes can include waxes containing branched alkanes and copolymerized with monomers such as, but not limited to, propylene and polyethylene and Fischer-Tropsch type waxes. Polyethylene wax is not in the same category as polyethylene, a polymer of ethylene monomers.

Lipids include, but are not limited to, mono, and/or -di, and/or -tri glycerides of alkanoic acids, or of monoenoic acids or of polyunsaturated fatty acids with carbon chain length from $C_4$-$C_{24}$ or mixture thereof, hydrogenated and partially hydrogenated mono, and/or di-, and/or tri-glycerides of monoenoic acid and of polyunsaturated fatty acids, acetylated glycerides of fatty acids, lecithin, paraffin wax, microcrystalline and natural waxes such as beeswax and carnauba, and combinations thereof. In certain embodiments, the lipids are present in amounts of from about 5% to about 45% w/w.

Other optional ingredients such as antioxidants and colorants can also be used in the gum base. Antioxidants prolong shelf-life and storage of gum base, finished gum or their respective components including fats and flavor oils. Antioxidants suitable for use in gum base or gum of the present invention include butyiated hydroxyanisole (BHA), butylated hydroxytoluene (BHT), beta-carotenes, tocopherols, acidulants such as Vitamin C, propyl gallate, other synthetic and natural types or mixtures thereof in free-flowing ground or pulverized form. In certain embodiments, colorants and whiteners include, but are not limited to, FD&C-type dyes and lakes, fruit and vegetable extracts, titanium dioxide or mixtures thereof. In certain embodiments, the gum base compositions contain optional minor amounts (about one percent or less) of miscellaneous ingredients such as colorants, antioxidants, etc.

In certain embodiments, the gum base composition is substantially free of natural elastomers and filler.

3. Chewing Gum

The presently disclosed subject matter includes chewing gum formulations comprising the above disclosed gum base compositions. Methods of making the chewing gum formulations are also contemplated.

3.1 Formulations

In certain embodiments, the gum base compositions disclosed above can be incorporated into chewing gum formulations. In certain embodiments, the chewing gum formulation can include one of the disclosed water-insoluble gum base compositions and a water-soluble bulking agent portion.

The water soluble portion of the chewing gum typically includes a bulking agent (also called bulk sweeteners) together with minor amounts of secondary components such as flavoring agents (including sensates such as physiological cooling agents, warming agents and tingling agents), high-intensity sweeteners, colorants, water-soluble softeners, acidulants, fillers, and binders. Typically, the water-soluble portion, sensates, and flavors dissipate during chewing and the gum base is retained in the mouth throughout the chew.

In certain embodiments, bulking agents or bulk sweeteners can include both sugars and sugar alcohols. Bulk sweeteners can constitute from about 5% to about 95% w/w of the chewing gum, more typically, from about 20% to about 80% w/w, and more commonly, from about 30% to about 60% w/w of the gum. Sugar sweeteners generally include saccharide-containing components commonly known in the chewing gum art, including but not limited to, sucrose, dextrose, maltose, dextrin, dried invert sugar, fructose, galactose, corn syrup solids, and the like, alone or in combination. Sugarless sweeteners include, but are not limited to, sugar alcohols such as sorbitol, mannitol, xylitol, hydrogenated starch hydrolysates, maltitol, erythritol, isomalt and the like, alone or in combination.

In certain embodiments, a variety of flavoring agents can also be used, if desired. In certain embodiments, the flavor can be used in amounts of about 0.1% to about 15% w/w of the gum, and preferably, from about 0.2% to about 5% w/w of the gum. In certain embodiments, the flavoring agent is present in an amount within the range of from about 0.1% to about 10.0% w/w or from about 0.5% to about 3.0% w/w of the gum formulation. In certain embodiments, the flavoring agent is present in an amount of about 0.9% w/w of the gum formulation. Flavoring agents can include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components can also be used. Natural and artificial flavoring agents can be combined in any sensorially acceptable fashion. Included in the general category of flavors are sensates, chemicals which impart physiological sensations in the mouth such as cooling agents, warming agents and tingling agents. Examples of cooling agents include menthol, WS-23, WS-3, WS-5, isopulegol, esters of menthol such as menthyl succinate, menthyl lactate and menthyl glutarate, among others. Warming and tingling agents include capsaicin, piperine, jambu and spilanthol. In certain embodiments, tackifiers include, but are not limited to, natural rosin esters such as glycerol ester of partially hydrogenated rosin, glycerol ester of polymerized rosin, glycerol ester of partially dimerized rosin, glycerol ester of rosin, pentaerythritol esters of partially hydrogenated rosin, methyl and partially hydrogenated methyl esters of rosin, pentaerythritol ester of rosin or mixtures; synthetic resins such as terpene resins derived from alpha-pinene, beta-pinene and/or d-limonene, polyvinyl acetate resin, polyethylene, poly-dl-lactide resin and combinations thereof. In the case of fruit flavored gums, up to about 3% w/w of an acid such as citric acid, malic acid or adipic acid can be added for tartness.

In some embodiments, the chewing gum ingredients will include one or more high intensity sweeteners. As used herein, the term "high intensity sweetener" refers to any substance that is at least twenty times sweeter than sucrose. Such sweeteners include saccharin, cyclamate, aspartame, alitame, neotame, other peptide-based sweeteners, sucralose, acesulfame K, *stevia* (including purified extracts such as rebaudioside A), glycyrrhizin, neohesperidin dihydrochalcone and mixtures thereof. In some embodiments, at least a portion of the high intensity sweetener can be encapsulated. Such encapsulations can be produced by granulation, agglomeration, extrusion and grinding, spray drying, fluid bed encapsulation or any other known means. In certain embodiments, suitable sugar alcohols include sorbitol, mannitol, xylitol, hydrogenated starch hydrolysates, maltitol, and the like, as well as combinations thereof. In certain embodiments, the sugarless gum comprises a combination of a high-potency sweetener with a sugar alcohol, e.g., aspartame and sorbitol. Usage levels will depend on the potency of the sweetener, degree and effectiveness of the encapsulation (if any) as well as the sensory profile desired for the product. Generally, the sweetener can be used in a range of from about 0.005% to about 5% w/w. The sweetener can be used at levels as low as about 0.005% w/w or as low as about 0.05% w/w or as low as about 0.2% w/w. The sweetener can be used at levels as high as about 5% w/w or about 3% w/w or about 2% w/w in the chewing gum composition. In certain embodiments, the high intensity sweetener can be present at a level of from about 0.1% to about 1.0% of the chewing gum ingredients.

In certain embodiments, fillers include, but are not limited to, magnesium and calcium carbonate, ground limestone and silicate types such as magnesium and aluminum silicate, clay, alumina, talc as well as titanium oxide, mono-, di- and tricalcium phosphate, cellulose polymers such as ethyl, methyl and wood or mixtures thereof, and combinations thereof.

In certain embodiments, plasticizers include, but are not limited to, glycerol triacetate, triethyl citrate, acetyl triethylcitrate, methyl ester of wood rosin and combinations thereof. Plasticizers can be used as softeners. In certain embodiments, the plasticizers are present in amounts ranging from about 0% to about 15% w/w.

In certain embodiments, softeners are added to the chewing gum in order to optimize the chewability and mouth feel of the gum. In certain embodiments, softeners (also known in the art as plasticizers or plasticizing agents) can constitute between about 0% to about 15% w/w, or from about 0.5% to about 15.0% w/w of the chewing gum formulation. Softeners include, but are not limited to, glycerin, lecithin, and combinations thereof. Further, aqueous sweetener solutions such as those containing sorbitol, hydrogenated starch hydrolysates, corn syrup and combinations thereof can be used as softeners and binding agents in chewing gum formulations. In certain embodiments, the chewing gum formulation contains about 1% w/w glycerin. In certain embodiments, the chewing gum formulation contains about 1.4% w/w glycerin.

If a low calorie gum is desired, a low calorie bulking agent can be used. Examples of low calorie bulking agents include: polydextrose; oligofructose (Raftilose); inulin (Raftilin); fructooligosaccharides (NutraFlora); palatinose oligosaccharide; guar gum hydrolysate (BeneFiber); or indigestible dextrin (Fibersol). However, other low calorie bulking agents can be used.

In certain embodiments, the gum base compositions as disclosed herein, can be incorporated into a sugarless chewing gum formulation. In certain embodiments, sugarless sweeteners can include components with sweetening characteristics but that are devoid of the commonly known sugars. In certain embodiments, examples include, but are not limited to high-potency sweeteners and/or sugar alcohols.

Combinations of sugar and/or sugarless sweeteners can be used in chewing gum. Additionally, the softener can also provide additional sweetness such as with aqueous sugar or alditol solutions.

In certain embodiments, the water-soluble sweetener portion is a mixture of sugar at about 50% w/w of the final chewing gum, dextrose monohydrate at about 10% w/w, and/or corn syrup at about 17% w/w. In certain embodiments, the formulation comprises about 60% w/w sucrose and/or about 17% w/w corn syrup. In certain embodiments the formulation comprises about 58.7% w/w sucrose and/or about 17% w/w corn syrup.

In certain embodiments, the insoluble gum base composition constitutes between about 5% to about 95% w/w of the chewing gum formulation. In certain embodiments, the insoluble gum base composition comprises between about 10% and about 50% w/w, or about 20% to about 35% w/w of the chewing gum formulation.

3.2 Methods of Making

The presently disclosed subject matter includes methods of making a chewing gum formulation comprising the gum base compositions discussed above.

In certain embodiments, the cross-linked hydrocolloids and the coupling agents can be pre-blended in the mixer either in the presence or absence of molten lipid solution in the temperature range of from about 60° C. to about 120° C. for about 10 to about 30 minutes before compounding with other base or gum ingredient in a conventional manner. In certain embodiments, the ratio of cross-linked hydrocolloids to lipids is in the range of about 3:0.5 or about 2:1.

In certain embodiments, the cross-linked hydrocolloids and the coupling agents or their pre-blended mixture can be directly combined with other base ingredients in a conventional manner known in the art. In certain embodiments, the gum base can be prepared by adding an amount of the elastomers, tackifiers, cross-linked hydrocolloids, coupling agents, thermoplastic block copolymers and filler to a heated sigma blade mixer with a front to rear blade speed ratio of about 2:1. The initial amounts of ingredients can be determined by the working capacity of the mixing kettle in order to attain a proper consistency.

In certain embodiments, after the initial ingredients have massed homogeneously, the balance of the tackifiers, cross-linked hydrocolloids/coupling agents, lipids, filler, plasticizer, etc. are added in a sequential manner until a completely homogeneous molten mass is attained. In certain embodiments, this can usually be achieved in about one to about four hours, depending on the formulation. In certain embodiments, the final mass temperature can be between about 60° C. and about 150° C., or between about 80° C. and about 120° C. In certain embodiments, the completed molten mass is emptied from the mixing kettle into coated or lined pans, extruded or cast into any desirable shape and allowed to cool and solidify. In certain embodiments, synthetic elastomers, synthetic resins, plasticizers, filler, and/or the cocoa powder can be added to a mixing vessel. In certain embodiments, the ingredients are softened by heating to between about 220° F. and about 250° F. and then mixed at that temperature for a time sufficient to insure a homogenous mass, typically between about 1 to about 2 hours. In certain embodiments, the mass or base can be formed into slabs or pellets and allowed to cool before use in making chewing gum. Alternatively, the molten mass can be used directly in a chewing gum manufacturing process.

In certain embodiments, the pre-blended cross-linked hydrocolloid/coupling agent mixtures can also be added at the beginning of gum preparation.

In certain embodiments, chewing gum is manufactured by sequentially adding the various chewing gum ingredients to a commercially available mixer known in the art. In certain embodiments, after the ingredients have been thoroughly mixed, the gum mass can be discharged from the mixer and shaped into the desired form such as by rolling into sheets and cutting into sticks, extruding into chunks or casting into pellets.

In certain embodiments, the ingredients are mixed by first melting the gum base and adding it to the running mixer. In certain embodiments, the base can be melted in the mixer itself. In certain embodiments, color or emulsifiers can be added at this time. In certain embodiments, a softener, for example, glycerin can be added at this time along with syrup and a portion of bulking agent. In certain embodiments, further portions of the bulking agent can then be added to the mixer. In certain embodiments a flavoring agent is added with the final portion of the bulking agent. In certain embodiments, a twice coated sweetener can be added after the final portion of bulking agent and flavor have been added.

In some embodiments a coating can be applied to the extruded chewing gum. In certain embodiments, this is accomplished by pan coating the expanded chewing gum piece. In a pan coating process, centers (e.g., expanded chewing gum pieces) are tumbled in a pan while a coating syrup, typically a sugar or sugar alcohol solution, is applied, for instance by spraying or ladling. Between applications of the coating syrup, the pellets are dried, preferably by passing a current of heated and/or dried air over or through the pellet bed. Numerous layers of coating are built up, often alternating with applications of powdered coating material or an inert filler to accelerate the build-up of the coating. A final layer of a polishing compound, for example carnauba wax, can be applied. In addition to sugar (sucrose), preferred coating materials include maltitol, isomalt, xylitol, sorbitol and erythritol, although others can be used as well. In addition to the coating material, the coating syrup can include film forming agents such as Gum Arabic, high intensity sweeteners, flavors and colors.

EXAMPLES

The presently disclosed subject matter will be better understood by reference to the following Examples, which are provided as exemplary of the disclosed subject matter, and not by way of limitation.

Example 1: Affectivity Test of Coupling Agents

This Example provides an evaluation of coupling agents with polymer compositions of the presently disclosed subject matter.

A. Preparation 1 gram (g) croscarmellose sodium was added into eight centrifuge tubes with 10 ml water solution. After vigorous shaking using a shaker (Wrist Action Shaker, Burrell Co., Pittsburgh, Pa.), for half an hour, 10 ml toluene was added into the tubes and two layers were formed. Then, coupling agents as described in Table 1 were added separately into each tubes and the tubes were put into an ultrasonic bath (Solid state/Ultrasonic T-28B, L&R Manufacturing Company, Kearny, N.J.) at room temperature for half an hour. The tubes were then centrifuged in the centrifuge (Beckman TJ-6) for 15 min at high speed and 25° C.

B. Analysis

Table 1 provides the effectivity of each coupling agent.

TABLE 1

Effectivity of various coupling agents.

| Coupling agents | Ratio to CMC | EFFECTIVITY |
|---|---|---|
| DATEM | 5% | milky thick liquid |
| succinylated monoglyceride | 5% | milky thick liquid |
| hydroxystearic acid-polyethylene glycol copolymer | 5% | milky thick liquid |
| Acetylated monoglyceride of soya oil | 5% | 2 layer: clear liquid + translucent gel |
| Monoglyceride of stearic acid | 5% | 2 layer: clear liquid + translucent gel |
| Lecithin | 5% | 2 layer: milky liquid + opaque gel |
| citric acid esters of monoglycerides | 5% | milky thick liquid |
| Stearic acid | 5% | 2 layer: clear liquid + translucent gel |
| Control | 0 | 2 layer: clear liquid + translucent hard gel |

C. Results

The results shown in Table 1 indicate that DATEM, citric acid esters of monoglycerides, succinylated monoglyceride and hydroxystearic acid-polyethylene glycol copolymer are very effective at stabilizing cross-linked CMC gel in a hydrophobic toluene solution.

Example 2: Pre-Blended Croscarmellose Sodium with Citric Acid Esters of Monoglycerides in Hydrogenated Cotton Seed Oil This Example provides a preparation of a polymer composition of the disclosed subject matter.

In a gum base mixer (Plastograph from Brabender Corp., Rochelle Park, N.J.) set at 100° C., croscarmellose sodium (degree of substitution 0.7, Ac-Di-Sol, FMC Corporation, Newark, Del.), citric acid ester of monoglycerides (GRINDSTED CITREM, Danisco Cultor USA, Inc.,) and hydrogenated cotton seed oil (CSO FLK, Humko Co.) were compounded for 15 minutes. The weight percent of these three components were 60.0%, 3.6% and 36.4%, respectively.

Example 3: Pre-Blended Croscarmellose Sodium with Diacetyl Tartaric Acid Esters of Monoglycerides This Example provides a preparation of a polymer composition by the methods described in Example 2, however the coupling agent was diacetyl tartaric acid esters of monoglycerides (PANODAN, Danisco Cultor USA, Inc.).

Example 4: Pre-Blended Croscarmellose Sodium with Hydroxy-Terminated Polybutadiene This Example provides a preparation of a polymer composition by the methods described in Example 2, however the coupling agent was hydroxy-terminated 1,3-butadiene (Molecular weight 2000 g/mole, Krasol LBH2000, Sartomer Company, West Chester, Pa.). The weight percent of these three components (croscarmellose sodium, coupling agent and hydrogenated cotton seed oil) was 47.7%, 15.9% and 36.4%, respectively.

Example 5: Preparation of Gum Formulations

In this Example, 6 chewing gum formulations (A-F) were prepared as described in Table 2.

TABLE 2

Chewing Gum Formulations

| % (WT.) | A | B | C | D | E | F |
|---|---|---|---|---|---|---|
| Isoprene-Isobutylene | 4.9 | 10.0 | 10.0 | 10.0 | 10.0 | 10.0 |
| SBS block copolymer | 4.4 | — | — | — | — | — |
| Polyvinyl acetate | 22.3 | 23.9 | 23.9 | 23.9 | 23.9 | 23.9 |
| Terpene resin | 15.4 | 16.5 | 16.5 | 16.5 | 16.5 | 16.5 |
| croscarmellose sodium | 19.7 | 19.6 | | | | — |
| crospovidone | | | 19.6 | | | |
| sodium starch glycolate | | | | 19.6 | | |
| Carbopol resin | | | | | 9.6 | |
| citric acid esters of monoglyceride | | 1.26 | 1.26 | 1.26 | 1.26 | |
| Glycerol monostearate | 5.3 | 5.6 | 5.6 | 5.6 | 5.6 | 5.6 |
| Hydroxy-terminated polybutadiene | 7.0 | | | | | |
| Coco powder | 0.54 | 0.58 | 0.58 | 0.58 | 0.58 | 0.58 |
| Hard fat | 11.7 | 12.5 | 12.5 | 12.5 | 12.5 | 12.5 |
| Shortening | 4.4 | 4.7 | 4.7 | 4.7 | 4.7 | 4.7 |
| Lecithin | 4.4 | 4.8 | 4.8 | 4.8 | 4.8 | 4.8 |
| Calcium carbonate | 0.26 | 0.53 | 0.53 | 0.53 | 10.5 | 21.4 |
| BHT | 0.02 | 0.03 | 0.03 | 0.03 | | 0.03 |

The polymer used in formulation C has particle size about 100 μμm (Polyplasdone XL, ISP Technologies, Inc., Wayne, N.J.). The polymer used in formulation D is produced from potato starch and contains 2.8-4.2% sodium (Primojel, DMV International, Veghel, The Netherlands). The sample used in formulation E has an average equivalent weight of 76 per carboxyl group (Carbopol 974P, Noveon, Inc, Cleveland, Ohio).

Example 6: Preparation of Gum Compositions

In this Example, 3 chewing gum formulations (G-I) were prepared as described in Table 3.

TABLE 3

Chewing Gum Formulations

| % (WT.) | G | H | I |
|---|---|---|---|
| Isoprene-Isobutylene | 12.7 | 10.0 | 10.0 |
| Polyvinyl acetate | 30.2 | 23.9 | 23.9 |
| Terpene resin | 20.8 | 16.5 | 16.5 |
| croscarmellose sodium | | | 19.7 |
| sodium starch glycolate | | 13.9 | |
| citric acid esters of monoglyceride | | 6.94 | |
| Glycerol monostearate | 7.15 | 5.6 | 5.6 |
| N-cocoyl sarcosine | | | 6.94 |
| Coco powder | 0.58 | 0.58 | 0.58 |
| Hard fat | 15.9 | 12.5 | 12.5 |
| Shortening | 5.9 | 4.7 | 4.7 |
| Lecithin | 6.0 | 4.8 | 4.8 |
| Calcium carbonate | 0.67 | 0.53 | 0.53 |
| BHT | 0.03 | 0.03 | 0.03 |

Example 7: Preparation of the Control Gum Base

In this Example, control gum base free of cross-linked hydrocolloids and coupling agents was made according to formulation G in Table 3.

Example 8: Preparation of Gum from the Bases Containing Cross-Linked Hydrocolloids with Coupling Agents In this Example, chewing gum formulations were made according to Table 4, using formulations G-I as described by Example 6. Formulations were made by conventional manners known to a person of skill in the art.

TABLE 4

Chewing gum formulations.

| % (wt.) | 8A | 8B | 8C | 8D | Control |
|---|---|---|---|---|---|
| A | 20.7 | | | | — |
| G | | 17.6 | | | |
| H | | | 20.7 | | |
| I | | | | 20.7 | |
| Example 6 | | | | | 20.7 |
| croscarmellose sodium | | 4.4 | | | |
| Hydroxylated lecithin | | 1.4 | | | |
| Sucrose | 60 | 58.7 | 60 | 60 | 60 |
| Corn syrup | 17 | 17 | 17 | 17 | 17 |
| Glycerin | 1.4 | | 1.4 | 1.4 | 1.4 |
| Flavor | 0.9 | 0.9 | 0.9 | 0.9 | 0.9 |

Example 9: Removability Test of Gum

This Example provides a test of removability of each of the gum formulation 8A-8D as produced in Example 8.

A. Preparation

Gum samples of formulations 8A-8D, as described by Example 8, and the control were water washed. Each chewed gum cud was taken out of water, and placed on a concrete surface with a release paper covering the top of the gum cud. Gum cuds were then sandwiched between 2 concrete blocks and pressed by weight (>120 lbs). The samples between the concrete blocks were heated at 90° F. for 24 hours. After removing the concrete block and the release paper, the samples were aged for 3 days at ambient temperature. A mechanical sweeper (Tennant 5700 XP) was used to remove the gum cud samples from the concrete block.

B. Analysis

The percentage of each gum sample removed from the concrete block is recorded in Table 5.

TABLE 5

Removal analysis.

| Gum cuds | Area removed % |
|---|---|
| 8A | 80 |
| 8B | 98 |
| 8C | 94 |
| 8D | 98 |
| Control | 0 |

C. Results

The results in Table 5 indicate that each of the gum cuds tested were removable while the Control gum sample was not.

Although the presently disclosed subject matter and its advantages have been described in detail, it should be understood that various changes, substitutions and alterations can be made herein without departing from the spirit and scope of the disclosed subject matter as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein can be utilized according to the presently disclosed subject matter. Accordingly, the appended claims are intended to include within their scope such processes, machines, manufacture, compositions of matter, means, methods, or steps.

Patents, patent applications publications product descriptions, and protocols are cited throughout this application the disclosures of which are incorporated herein by reference in their entireties for all purposes.

What is claimed is:

1. A chewing gum comprising a sweetener, a flavoring agent, and a chewing gum base, the chewing gum base comprising one or more cross-linked hydrocolloids and one or more coupling agents, wherein the one or more cross-linked hydrocolloids are selected from the group consisting of croscarmellose sodium and sodium starch glycolate, wherein the one or more coupling agents are selected from the group consisting of diacetyl tartaric acid esters of monoglycerides (DATEM), citric acid esters of monoglycerides, succinylated monoglyceride, hydroxy-terminated butadiene, and hydroxystearic acid-polyethylene glycol copolymer, and wherein the chewing gum base contains from about 5% to about 15% w/w coupling agents and from about 10% to about 60% w/w cross-linked hydrocolloid.

2. The chewing gum of claim 1, wherein the chewing gum base contains from about 10% to about 30% w/w cross-linked hydrocolloids.

3. The chewing gum of claim 1, wherein the chewing gum base consists of the cross-linked hydrocolloid(s), the coupling agent(s), and one or more ingredients selected from the group consisting of elastomers, polyvinyl acetate, elastomer plasticizers, fillers, softeners, and waxes.

4. The chewing gum of claim 1, wherein the chewing gum base further comprises at least one coupling agent selected from the group consisting of styrene-isoprene-styrene, styrene-butadiene-styrene, ethylene-propylene-ethylene, and ethylene-vinyl acetate-ethylene block copolymers.

5. The chewing gum of claim 1, wherein the chewing gum base comprises one or more coupling agents selected from the group consisting of diacetyl tartaric acid esters of monoglycerides (DATEM), citric acid esters of monoglycerides, and hydroxy-terminated butadiene.

6. The chewing gum of claim 1, wherein the chewing gum base contains from about 5% to about 10% w/w coupling agents.

7. The chewing gum of claim 1, wherein the chewing gum comprises the chewing gum base in an amount of from about 5% to about 95% w/w of the chewing gum.

8. The chewing gum of claim 1, wherein the chewing gum comprises the chewing gum base in an amount between about 10% and about 50% w/w of the chewing gum.

9. A chewing gum comprising a sweetener, a flavoring agent, and a chewing gum base in an amount of from about 5% to about 95% w/w of the chewing gum, wherein the chewing gum base comprises:

from about 10% to about 30% w/w cross-linked hydrocolloids, wherein the cross-linked hydrocolloids are selected from the group consisting of croscarmellose sodium and sodium starch glycolate; and from about 5% to about 15% w/w coupling agents, wherein the coupling agents are selected from the group consisting of diacetyl tartaric acid esters of monoglycerides (DATEM), citric acid esters of monoglycerides, succinylated monoglyceride, hydroxy-terminated butadiene, and hydroxystearic acid-polyethylene glycol copolymer.

10. The chewing gum of claim 9, wherein the chewing gum base consists of the cross-linked hydrocolloid(s), the coupling agent(s), and one or more ingredients selected from the group consisting of elastomers, polyvinyl acetate, elastomer plasticizers, fillers, softeners, and waxes.

* * * * *